Oct. 16, 1951 — C. O. LOFGREN — 2,571,904
BROACHING MACHINE
Filed May 25, 1949 — 4 Sheets-Sheet 1

Oct. 16, 1951  C. O. LOFGREN  2,571,904
BROACHING MACHINE
Filed May 25, 1949  4 Sheets-Sheet 2

Inventor:
Charles O. Lofgren,
By Schroeder, Merriam,
Hofgren & Brady Attys.

Oct. 16, 1951     C. O. LOFGREN     2,571,904
BROACHING MACHINE
Filed May 25, 1949     4 Sheets-Sheet 3

Inventor:
Charles O. Lofgren,
By Schroeder, Merriam,
Hofgren + Brady, Attys.

Oct. 16, 1951  C. O. LOFGREN  2,571,904
BROACHING MACHINE
Filed May 25, 1949  4 Sheets-Sheet 4

Inventor:
Charles O. Lofgren,
By Schroeder, Merriam,
Hofgren & Brady Attys.

Patented Oct. 16, 1951

2,571,904

UNITED STATES PATENT OFFICE 2,571,904

BROACHING MACHINE

Charles O. Lofgren, Ann Arbor, Mich., assignor to American Broach & Machine Company, a corporation of Michigan Application May 25, 1949, Serial No. 95,260

15 Claims. (Cl. 90—33)

This invention relates to broaching machines, and more particularly to broaching machines having means for automatically feeding a work piece to a waiting station, for moving said work piece through a stroke wherein the broaching operation is performed, for freeing said work piece from the moving means, and for feeding another work piece into position for broaching operation in synchronism with the operation of said moving means.

The general object of the invention is to provide an improved broaching machine wherein work pieces are automatically fed singly to a broaching machine, a broaching operation is performed upon each piece, and the piece is freed from the feeding mechanism.

Another object of the invention is to provide a machine having a magazine for holding a plurality of work pieces together with means for feeding work pieces singly from said magazine to said machine.

Another object of the invention is to provide a friction jaw for gripping a work piece in said machine and moving said work piece adjacent a broaching tool to perform a broaching operation, together with means for freeing the work piece from the jaw after the broaching operation has been performed.

Another object is to provide a machine having a movable jaw which picks up a work piece and carries it through a work stroke while moving in one direction.

Another object is to provide a machine having a movable friction jaw and means for causing said jaw to grip the work piece tightly and hold it against rotation during the work stroke.

Another object is to provide means for supporting the work piece in the machine in the path of the gripping jaw after the work piece has been fed from the magazine.

Another object is to provide actuating means for the feeding means, said actuating means being operated by the mechanism which carries the work piece adjacent the broaching tool to feed work pieces to the machine in synchronism with the operation of said mechanism.

Other objects and advantages will become apparent from the following detailed description taken in connection with the accompanying drawings, in which.

Figure 1:
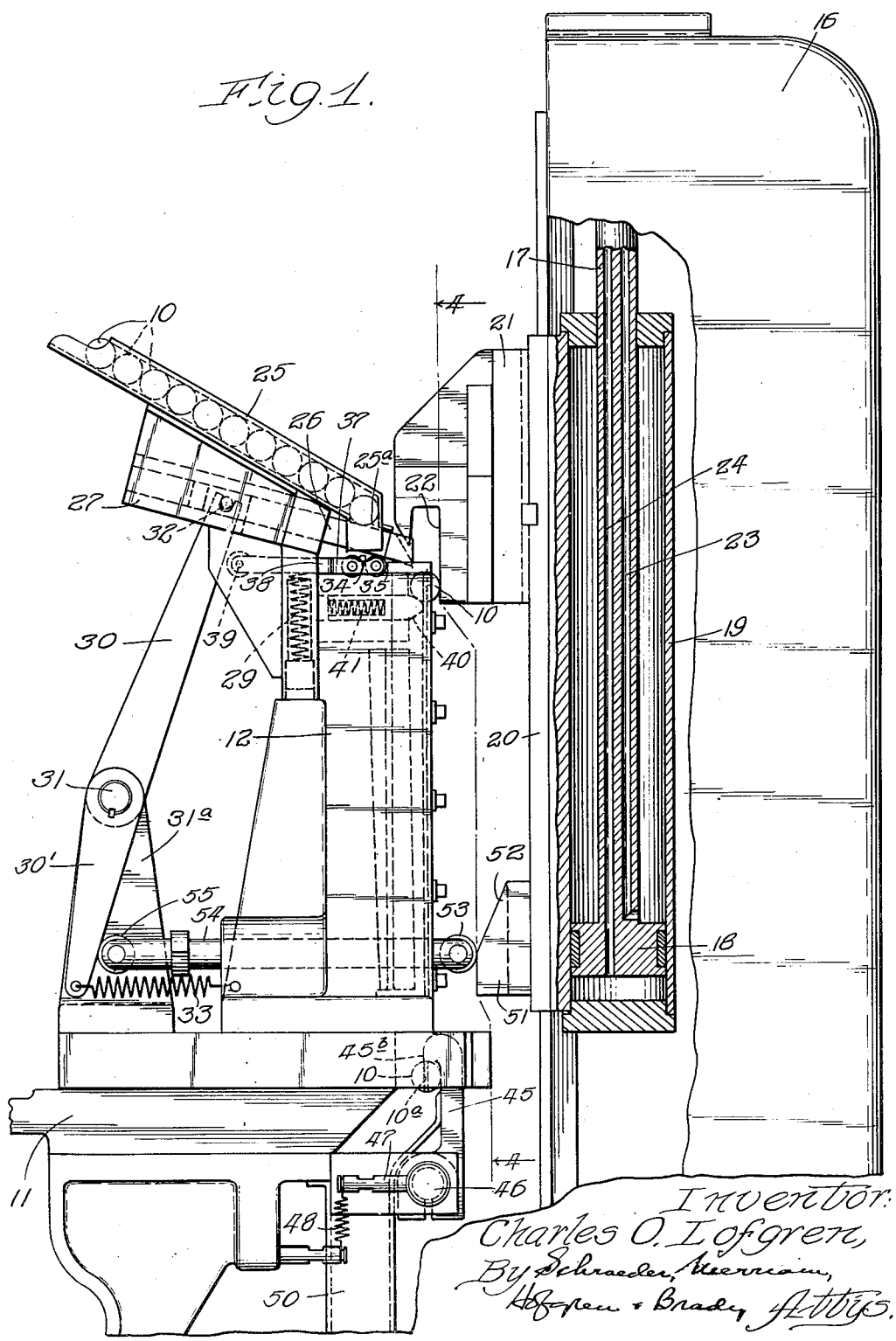
Fig. 1 is a fragmentary side elevation of a broaching machine constructed in accordance with the invention.
Figure 2:
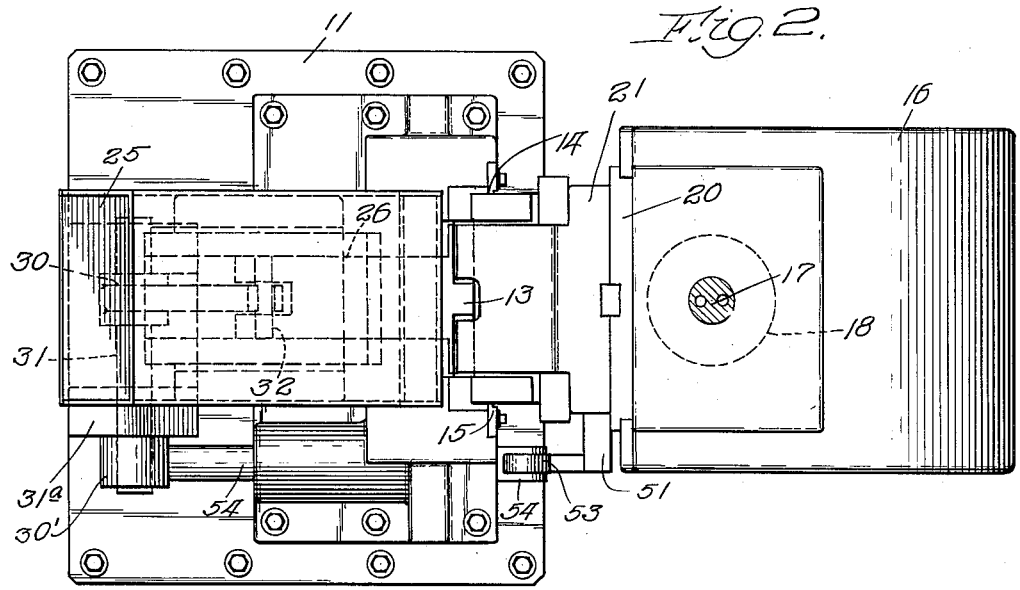
Fig. 2 is a top plan view of the machine of Fig. 1.

While my invention is susceptible of embodiment in many forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

Figure 3:
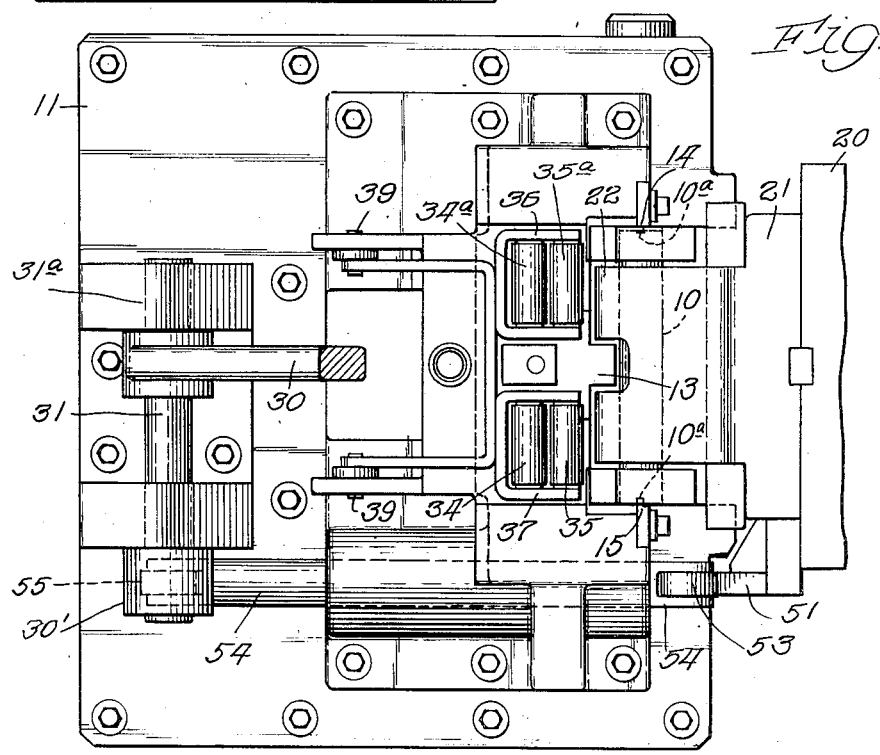
Fig. 3 is an enlarged fragmentary top plan view similar to Fig. 2 but with the feed magazine and gate therefor removed.

Referring now more particularly to the drawings, the broaching machine shown fragmentarily in the attached drawings is intended to operate on short cylindrical work pieces 10 and to broach a flat area 10b (Fig. 4) intermediate the ends of each work piece and a slot in each end of the work piece as shown at 10a in Figs. 1 and 3.

The broaching machine on which the improved feed mechanism is installed is generally of conventional design. Basically, the machine comprises a base or frame portion 11 having an upstanding vertical column 12 on the face of which is mounted a conventional broaching tool 13 for broaching the flat area intermediate the ends of the work piece. Additional broaching tools 14 and 15 are mounted on the machine for broaching the slots in the respective ends of the work piece. Another column 16 on the machine supports operating mechanisms comprising a piston and cylinder device for obtaining the necessary cyclical motion in the machine parts to perform the broaching operation. In the machine shown in the drawings a piston rod 17 depends from the head of this column and carries at its lower end a stationary piston 18 housed in a reciprocable cylinder 19. Fluid may be fed to the cylinder on opposite sides of the piston through pipes 23 and 24 for obtaining relative movement between the piston and cylinder to perform the broaching operation.

A reciprocable head 20 is carried on the cylinder 19 for vertical movement therewith, said head having at its upper end a block 21 carrying a tapered jaw 22 for frictionally gripping a work piece and carrying it downwardly through a work stroke, the work piece passing through a broaching channel defined on three of its sides by the broaching tools 13, 14 and 15. During the work stroke the tools broach the work piece. After the broaching operation has been performed, the reciprocating head moves upwardly through a return stroke to complete a cycle of operation.

Figures 5, 6:
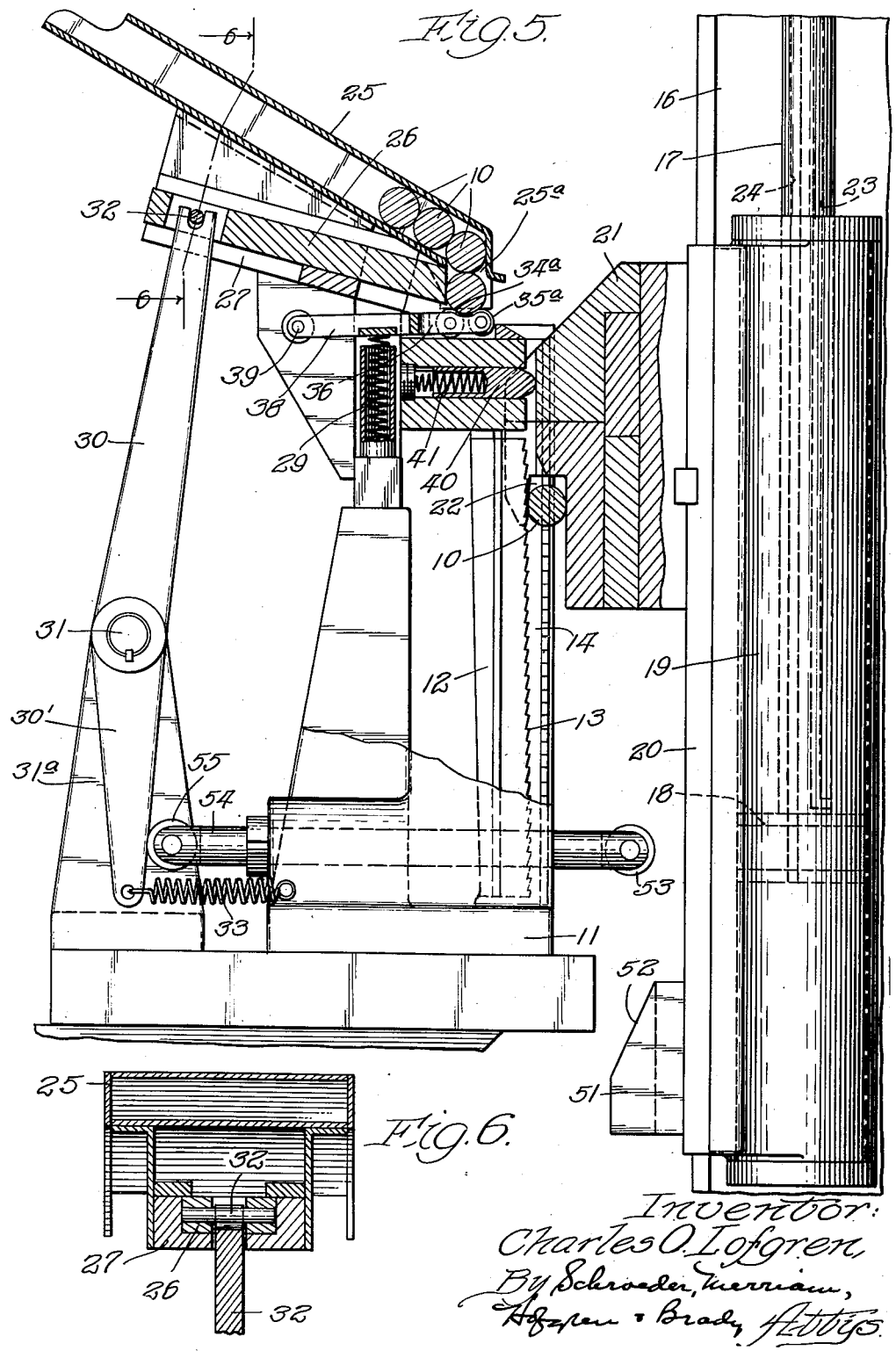
Fig. 5 is an enlarged fragmentary side elevational view partly in section, but with the parts in different position than the position shown in Fig. 1.
Fig. 6 is a vertical section taken along the line 6—6 of Fig. 5.

A magazine 25 is mounted on the machine and is adapted to hold a plurality of the cylindrical work pieces 10 as shown in Figs. 1 and 5, the magazine having an outlet portion 25a to which the work pieces are fed by gravity. Adjacent the outlet of the magazine a reciprocable gate member 26 is mounted for sliding movement in a support 27. In one position the gate member 26 projects below the outlet 25a to prevent the work piece adjacent the magazine outlet from being released from the magazine. The gate member 26 is operated by a gate actuating lever which consists of arms 30 and 30' mounted on a shaft 31 which is carried on a bracket 31a extending above the frame 11 of the machine. The free end of the arm 30 is movably connected to the gate member 26 by a pin 32 and the free end of the arm 30' is resiliently connected to the machine frame by a spring 33 which exerts a force to pivot the lever in a counter-clockwise direction from the position of Fig. 1 to the position of Fig. 5 wherein the gate member has been moved away from the magazine outlet 25a. When the lever and gate member are in the position of Fig. 5 a single work piece 10 is released from the magazine 25 and falls upon pairs of rollers 34, 34a and 35, 35a which are carried on brackets 36 and 37 respectively, these brackets being welded or otherwise secured on the base portion of a U-shaped bracket 38 which is pivotally mounted on pins 39 on the machine. A spring 29 engages the bracket 38 and urges the rollers 34 and 35 up toward the magazine outlet, a yielding motion being necessary to feed the work piece from the rollers into the machine.

When the gate member 26 is moved from the position of Fig. 5 to the position of Fig. 1, the rollers yield downwardly and permit the workpiece to be fed into the machine where it is supported at a waiting station in the broaching channel immediately below the jaw 22. In order to support the work piece in this position a detent 40 projects into the broaching channel, a spring 41 being provided to urge the detent into the channel. Fig. 1 shows a work piece supported at the waiting station by the detent 40, the block 21 preventing the work piece from falling down through the channel.

Figure 4:
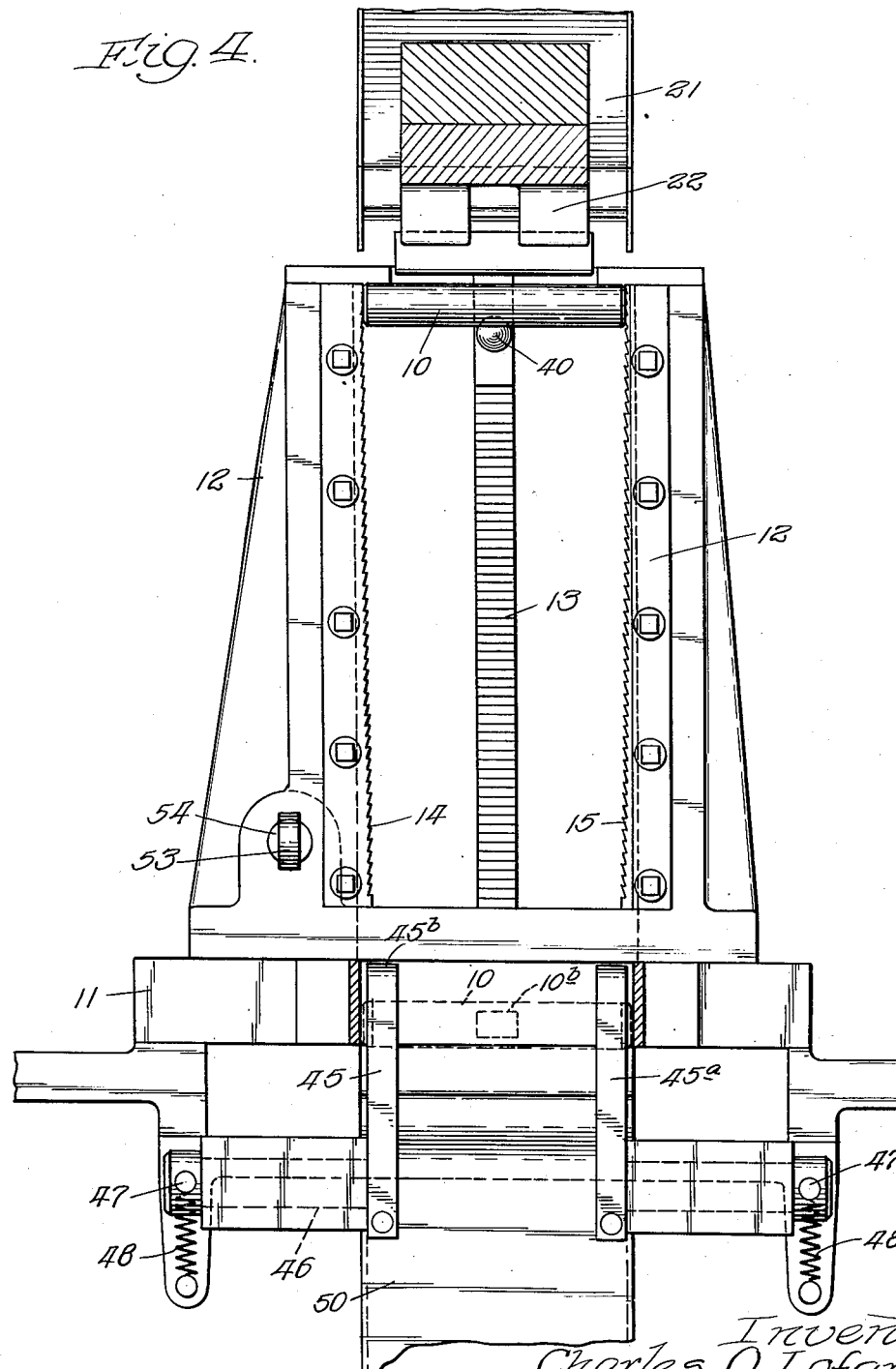
Fig. 4 is an enlarged fragmentary vertical section along the line 4—4 of Fig. 1.

With a work piece supported at the waiting station as shown in Fig. 1, hydraulic fluid is fed to the cylinder 19 in a manner to move the reciprocable head 20 downwards through a work stroke. During this downward movement the tapered jaw 22 engages the work piece in the manner shown in Fig. 5 and forces it down through the broaching channel past the detent 40, the spring 41 yielding to permit movement of the detent. Sufficient force is required to move the detent to cause the work piece to be jammed into the tapered jaw tightly so that the work piece is held against rotation during the broaching operation. During the work stroke the work piece is moved adjacent the broaching tools as shown in Figs. 4 and 5, and the broaching operation is performed, the tool 13 broaching a flat area intermediate the ends of the work piece, and the respective tools 14 and 15 broaching a slot in each end of the work piece.

A claw member having arms 45 and 45a is in the path of the work piece adjacent the lower end of the work stroke, this claw member having a latch or claw portion 45b between the arms 45 and 45a permitting the claw to be moved to an out of the way position upon engagement with the work piece during the work stroke, but preventing the work piece from moving the claw member during the return stroke. The claw arms are pivotally mounted on a shaft 46 from which arm portions 47 and 47a extend substantially at right angles to the portions 45 and 45a and are connected to the machine frame by springs 48 and 48a to bias the claw in the position shown in Fig. 1. Near the end of the work stroke the work piece engages the rounded surface of the latch portion 45b and the claw is pivoted in a clockwise direction against the tension of the spring 48 and 48a to an out of the way position. When the work piece has moved below the portion 45b the springs cause the claw to pivot back to the position of Fig. 1, and upon the return stroke the work piece is positively engaged by the claw portion 45b and pulled free of the jaw 22. While a work piece is shown in Fig. 1 as being in engagement with the claw after the completion of the return stroke, this is merely for purposes of illustration to show the positive engagement and normally the work piece would drop through a chute 59 into a hopper (not shown).

The reciprocable head 20 carries a cam block 51, this block being spaced from the jaw carrying block 21 and having a cam surface 52. With the parts in the position of Fig. 1 wherein a work piece 10 is held in waiting position on the detent 40, the cam block 51 engages a roller 53 on the end of a push bar 54. The other end of this push bar carries a roller 55 which is adjacent the lower end of the actuating lever 30. Referring to Fig. 5 is will be seen that as the reciprocable head 20 moves downwardly on the work stroke to carry the work piece through the broaching channel, the cam block 51 moves away from the end of the push bar 54, permitting the spring 33, which is secured to the frame of the machine and the lower end of the lever 30, to pivot the lever 30 in a counter-clockwise direction from the position of Fig. 1 to the position of Fig. 5. Since the top end of the lever 30 is movably connected to the gate member 26 by the pin 32, the gate member is moved to the left (as the parts are illustrated) to uncover the outlet 25a of the magazine 25, releasing a single work piece which falls upon the rollers 34, 34a and 35, 35a. The push rod 54, lever 30 and gate member 26 remain in the position of Fig. 5 throughout the balance of the work stroke and throughout the greater part of the return stroke until the reciprocable head 20 in its upward movement during the last part of the return stroke carries the cam block 51 up to a point where the cam surface 52 engages the roller 53 on the end of the push rod 54 so that the final portion of the return stroke moves the roller 53 over the cam surface 52 to return the parts to the position of Fig. 1. During this movement the lever 30 pivots in a clockwise direction, moving the gate member to the right and causing it to push the work piece 10 from the rollers 34 and 35 into the waiting station in the broaching channel of the machine where it is supported by the detent 40, ready for the next broaching operation.

I claim:

1. A vertical broaching machine comprising, in combination, a column adapted to have broaching tools mounted thereon defining a channel through which work pieces may pass, a vertical piston and cylinder device having one part thereof forming a work carrier mounted for movement downwardly through a work stroke and upwardly through a return stroke, a work chuck mounted on said carrier near the upper end thereof, said chuck having converging friction gripping jaws adapted to grip a cylindrical work piece during a work stroke and carry it through said channel to perform a broaching operation thereon, an inclined magazine on said machine for holding a plurality of work pieces, a reciprocable gate member adjacent the outlet of said magazine for feeding work pieces singly from said magazine to a waiting station immediately below the upper position of said work chuck, a spring biased detent for supporting a work piece at said waiting station, said detent being engaged by the work piece in the jaws and forcing said work piece tightly into said friction jaws so that the work piece is held against rotation during the broaching operation, the detent moving when force exerted by the work piece in the jaws exceeds the force of the spring to permit said work piece to be carried past said tools on the work stroke, a pivotally supported claw member in the path of said work piece below said broaching tools, movable to permit a work piece to pass near the end of the work stroke and operable to engage the finished work piece as the carrier returns upwardly and free said work piece from said jaws, a cam mounted on said carrier near the lower end thereof, a lever for actuating said gate member and having a pin and slot connection at one end with said gate member, a spring for moving said lever and gate member in one direction to release a work piece from said magazine, and a push rod having one end in the path of said cam for engagement by said cam near the end of the return stroke and operable to actuate said lever for moving said lever and gate member in the other direction to feed the released work piece to the waiting position.

2. A vertical broaching machine comprising in combination, a column adapted to have a broaching tool mounted thereon, a vertical piston and cylinder device having one part thereof forming a work carrier mounted for movement downwardly through a work stroke and upwardly through a return stroke, a work chuck mounted on said carrier near the upper end thereof, said chuck having converging tapered friction gripping jaws adapted to grip a cylindrical work piece during said work stroke and to carry it into engagement with said tool to perform a broaching operation on said work piece, a magazine on said machine for holding a plurality of work pieces, a reciprocable gate member adjacent the outlet of said magazine for feeding work pieces singly from said magazine to a waiting station immediately below the upper position of said work chuck, a spring biased detent for supporting a single work piece at said waiting station, said detent being engaged by the work piece in the jaws and forcing said work piece tightly into said friction jaws so that the work piece is held against rotation during the broaching operation, the detent moving when force exerted by the work piece in the jaws exceeds the force of the spring to permit said work piece to be carried past the tool on the work stroke, a pivotally supported claw member in the path of said work piece below said broaching tool, movable to permit a work piece to pass on the work stroke, and operable to engage said work piece as the carrier returns upwardly and free said work piece from said jaws, a cam mounted on said carrier near the lower portion thereof, a lever for actuating said gate member, and having one end movably connected with said gate member, a spring for moving said lever and gate member in one direction to release a work piece from said magazine, and a push rod having one end in the path of said cam for engagement by said cam near the end of the return stroke, and operable to actuate said lever for moving said lever and gate member in the other direction to feed the released work piece to the waiting position.

3. A broaching machine comprising, in combination, a column adapted to have a broaching tool mounted thereon, a piston and cylinder device having one part thereof forming a work carrier mounted for movement in one direction through a work stroke and in the opposite direction through a return stroke, said carrier having friction gripping jaws adapted to grip a work piece during a work stroke and carry it into engagement with said tool to perform a broaching operation on said work piece, a magazine on said machine for holding a plurality of work pieces, a reciprocable gate member adjacent the outlet of said magazine for feeding work pieces singly from said magazine to a waiting station immediately below the upper position of said work chuck, a spring biased detent for supporting a work piece at said waiting station, said detent being engaged by the work piece in the jaws and forcing said work piece tightly into said jaws so that the work piece is held against rotation during the broaching operation, the detent moving when force exerted by the work piece in the jaws exceeds the force of the spring to permit said work piece to be carried past said tool on the work stroke, a pivotally mounted claw member in the path of said work piece movable to permit a work piece to pass on the work stroke and operable to engage said work piece as the carrier returns in said other direction and free said work piece from said jaws, a cam mounted on said carrier in spaced relation to said jaw, a lever for actuating said gate member, and having one end connected to said gate member, a spring for moving said lever and gate member in one direction to release a work piece from said magazine, and a push rod having one end in the path of said cam and the other end adjacent said lever for moving said lever and gate member in the other direction to feed the released work piece to said waiting position.

4. A broaching machine comprising, in combination, a column adapted to have a broaching tool mounted thereon, a piston and cylinder device having one part thereof forming a work carrier mounted for movement in one direction through a work stroke and in the opposite direction through a return stroke, said work carrier having converging friction gripping jaws adapted to grip a work piece on a work stroke and carry it into engagement with said tool to perform a broaching operation, means on said machine for holding a plurality of work pieces, a reciprocable gate member slidably mounted adjacent said holding means for feeding work pieces singly to a waiting station adjacent said jaws, a spring biased detent for supporting a single work piece at said waiting station, said detent being engaged by the work piece in the jaws and forcing said work piece tightly into said friction jaw when said jaw moves on said work stroke so that the work piece is held against rotation during the broaching operation, the detent being movable against the force of the spring to permit said work piece to be carried past said tool on the work stroke, a cam mounted on said carrier in spaced relation to said jaws, a lever for actuating said gate member, and having one end movably connected to said gate member, a spring for moving said lever and gate member in one direction to release a work piece from said holding means, and a push rod having one end in the path of said cam and the other end adjacent said lever for moving said lever and gate in the other direction to feed the released work piece to the waiting position in synchronism with the operation of said work carrier.

5. A broaching machine comprising, in combination, a gravity feed magazine for holding a plurality of work pieces, a reciprocable gate member adjacent the outlet of said magazine for feeding work pieces singly from said magazine to a broaching channel in said machine, a spring biased detent projecting into said channel for supporting a work piece at a waiting station in said broaching channel, a reciprocable head having a jaw movable in one direction through a work stroke in said channel for frictionally gripping said work piece and moving it in said one direction past said detent and through said channel adjacent said tool to broach said work piece, said detent jamming said work piece into said jaw tightly to hold said work piece against rotation during said broaching operation, means operable after the completion of said broaching operation for freeing said work piece from said jaw comprising a claw member in the path of said work piece, said claw being pivotally mounted and being movable to an out of the way position by said work piece on the work stroke, a spring for moving said claw back into said path into position to engage said work piece as the head moves in the other direction on the return stroke and free said work piece from said jaw, a cam block mounted on said reciprocable head in spaced relation to said jaw, a lever for actuating said gate member, said lever being pivotally mounted intermediate its ends on said machine and having one end movably connected to said gate member, a spring for moving said lever and gate member in one direction to release a work piece from said magazine, and a push rod having one end in the path of said cam and the other end adjacent said lever near the other end thereof for moving said lever and gate in the other direction to feed a work piece to said machine in synchronism with the operation of said reciprocable head.

6. A broaching machine comprising, in combination, a gravity feed magazine for holding a plurality of work pieces, a reciprocable gate member adjacent the outlet of said magazine for feeding work pieces singly from said magazine to a broaching channel in said machine, means for supporting a work piece at a waiting station in said broaching channel, a reciprocable head having a jaw for gripping said work piece and moving it from said waiting station through said channel adjacent a broaching tool to broach said work piece, a cam block mounted on said head in spaced relation to said jaw, a lever for actuating said gate member, said lever being pivotally mounted on said machine and having one end movably connected to said gate member, a spring for moving said lever and gate member in one direction to release a work piece from said magazine, and a push rod having one end in the path of said cam and the other end adjacent said lever for moving said lever and gate in the other direction to feed a work piece to said machine in synchronism with the operation of said reciprocable head.

7. Apparatus of the character claimed in claim 6, wherein the means for supporting a work piece at said waiting station comprises a spring biased detent projecting into said channel.

8. A broaching machine comprising, in combination, a magazine for holding a plurality of work pieces, a reciprocable gate member adjacent the outlet of said magazine for feeding work pieces singly from said magazine to said machine, a reciprocable head having a jaw for gripping said work piece and moving it adjacent a broaching tool to broach said work piece, a cam block mounted on said head in spaced relation to said jaw, a lever for actuating said gate member, said lever being pivotally mounted on said machine and having one end connected to said gate member, spring means for moving said lever and gate member in one direction to release a work piece from said magazine, and a push rod having one end in the path of said cam and the other end adjacent said lever for moving said lever and gate in the other direction to feed a work piece to said machine in synchronism with the operation of said reciprocable head.

9. A broaching machine comprising, in combination, a magazine for holding a plurality of work pieces, a reciprocable gate member adjacent the outlet of said magazine for feeding work pieces singly from said magazine to said machine, reciprocable means having a jaw for gripping said work piece and moving it adjacent a broaching tool to broach said work piece, a cam block movable with said reciprocable means, a lever for actuating said gate member, means for moving said lever and gate member in one direction to release a work piece from said magazine, and a push rod in the path of said cam for moving said lever and gate in the other direction to feed a work piece to said machine in synchronism with the operation of said reciprocable means.

10. A broaching machine comprising, in combination, a magazine for holding a plurality of work pieces, means for feeding work pieces singly from said magazine to a broaching channel in said machine, means for supporting a work piece at a waiting station in said broaching channel, a reciprocable head having a jaw movable in one direction through a work stroke in said channel for frictionally gripping said work piece and moving it in said one direction from said waiting station through said channel adjacent a broaching tool to broach said work piece, means operable after the completion of said broaching operation for freeing said work piece from said jaw comprising a claw member in the path of said work piece, said claw being movable to an out of the way position by said work piece on the work stroke, means for moving said claw back into said path in position to engage said work piece as said head moves in the other direction on the return stroke and free said work piece from said jaw, and actuating means for said feeding means, said actuating means being operated by said reciprocable head to feed work pieces to said machine in synchronism with the operation of said reciprocable head.

11. A broaching machine comprising, in combination, a magazine for holding a plurality of work pieces, means for feeding work pieces singly from said magazine to a broaching channel in said machine, means for supporting a work piece at a waiting station in said broaching channel, reciprocable means having a jaw for gripping said work piece and moving it from said waiting station through said channel adjacent a broaching tool therein to effect a broaching operation on said work piece during its passage through said channel, means operable after the completion of said broaching operation for freeing said work piece from said jaw, and actuating means for said feeding means, said actuating means being operated by said reciprocable means to feed work pieces to said machine in synchronism with the operation of said reciprocable means.

12. A broaching machine having, in combination, an inclined chute for holding cylindrical work pieces, means adjacent the exit of said chute for releasably supporting a work piece, means for supporting a pair of opposed broaching tools in position to operate simultaneously on the opposite ends of a work piece, a reciprocating carrier, a jaw member on said carrier having wedge operating jaws facing in a direction to engage said work piece and operating first to withdraw it from said releasable supporting means and then to move the work piece through a cutting engagement with the broaches while the carrier moves in one direction, and a work retrieving device operable to remove the work piece from said jaws upon movement of the carrier in the opposite direction.

13. A broaching machine, having in combination, an inclined chute for holding cylindrical work pieces, means adjacent the exit of said chute for releasably supporting a work piece, means for supporting a pair of opposed broaching tools in position to operate simultaneously on the opposite ends of a work piece, a reciprocating carrier, a jaw member on said carrier having wedge operating jaws facing in a direction to engage said work piece and operating first to withdraw it from said releasable supporting means and then to move the work piece through a cutting engagement with the broaches while the carrier moves in one direction and a work retrieving device operable to remove the work piece from said jaw.

14. A broaching machine having, in combination, means for releasably supporting a work piece, means for supporting a pair of broaching tools in position to operate simultaneously on the opposite ends of such work piece, a reciprocating carrier, and a jaw member on said carrier having wedge shaped jaws facing in a direction to engage said work piece and operating first to withdraw it from said releasable supporting means and then to move the work piece through a cutting engagement with the broaches while the carrier moves in one direction.

15. A broaching machine having, in combination, means for releasably supporting a work piece, means for supporting a broaching tool, means for retrieving a finished work piece, a carrier means mounted for reciprocatory movement in a path passing each of said three means, a jaw on said carrier for gripping a work piece and operable as the carrier moves through its stroke in one direction, first, to grasp a work piece and withdraw it from said supporting means, second, to move the work piece through a cutting operation with a broaching tool on said tool supporting means, and third, to engage the work piece with said retrieving means.

CHARLES O. LOFGREN.

REFERENCES CITED

The following references are of record in the file of this patent:

UNITED STATES PATENTS

| Number | Name | Date |
|---|---|---|
| 1,300,051 | Townsend | Apr. 8, 1919 |
| 1,318,485 | Donaldson | Oct. 14, 1919 |
| 2,340,653 | Fregel | Feb. 1, 1944 |
| 2,390,533 | Hill | Dec. 11, 1945 |